TAPE HANDLING DEVICE

Filed Sept. 16, 1963 2 Sheets-Sheet 1

WALTER J. CHENEY,
ALAN G. GRACE &
AKIYOSHI IWATA
INVENTORS

BY Robert G. Clay
ATTORNEY

Jan. 4, 1966 W. J. CHENEY ET AL 3,227,343

TAPE HANDLING DEVICE

Filed Sept. 16, 1963 2 Sheets-Sheet 2

WALTER J. CHENEY,
ALAN G. GRACE &
AKIYOSHI IWATA
INVENTORS

BY Robert S. Clay

ATTORNEY

United States Patent Office 3,227,343

Patented Jan. 4, 1966

3,227,343
TAPE HANDLING DEVICE

Walter J. Cheney, San Mateo, and Alan G. Grace and Akiyoshi Iwata, Menlo Park, Calif., assignors to Ampex Corporation, Redwood City, Calif., a corporation of California Filed Sept. 16, 1963, Ser. No. 309,218
20 Claims. (Cl. 226—97)

This invention relates to tape transports and particularly to apparatus for handling tape in the vicinity of the transducing heads of such transports.

Previously, the magnetic tape transport art has been furnished with various types of "open loop," "closed-loop" and "zero-loop" devices. In the "open-loop" device, the tape comes from a supply reel and is guided to a transducing head, thence to a capstan and pinch roller, and thence to a takeup reel; and the tape in the so-called "loop" segment in the vicinity of the head is not isolated from vibrations originating at the supply reel. In the "closed-loop" and "zero-loop" devices, the tape in the vicinity of the transducing heads is isolated from vibrations emanating from the reels and tensioning system. In the "closed-loop" device, a capstan and pinch roller assembly is positioned at the neck of a tape loop, engaging and driving both shanks of the loop, and the heads are positioned to engage the isolated tape of the loop. In the "zero-loop" device, the heads engage the tape directly against the capstan. The "closed-loop" device permits more undesirable stiction vibration of the unsupported loop of tape than does the "zero-loop" device, which has no unsupported tape. Conversely, the "zero-loop" device is subject to undesirable variations in head-to-tape pressure due to out-of-roundness of the capstan, such variations being substantially avoided in the "closed-loop" device.

Another problem with the zero-loop device when it is used on multiple track machines is that solid mounting of the head is not possible because the head must be retractable for tape threading. Thus although the tracks on the tape can be precisely positioned laterally, the head may still vibrate and twist, causing time-displacement errors between the tracks. Conversely with closed-loop devices, while the head can be solidly mounted, edge guiding of the tape is quite difficult, and if the tape is not properly edge-guided as by a single reference edge of the tape, the tracks are not accurately positioned with respect to the head. One of the resulting positioning errors is a twisting error, resulting in the same time-displacement error between tracks that was referred to above.

Another problem is encountered in the magnetic tape instrumentation art where two or more multiple-track transducing heads are spaced along the length of the tape path and must be operated at a precisely predetermined distance from one another both during recording and replaying. One head records on odd tracks while the other head records on even tracks, and the signals recorded at any instant on all tracks must be replayed simultaneously. Such performance can be ensured in prior art machines only if the heads on all machines are at precisely the same spacing and if the tape has undergone no dimensional changes between recording and replay. Furthermore, variations in the tape tension between recording and replay may introduce errors. For example, with heads spaced apart 1.5 inches on the tape path, a tape tension change of from six ounces to twelve ounces can cause the 1.5-inch length of tape between the heads to stretch .0014 inch, which variation would be intolerable in instrumentation recorders.

Accordingly, it is an object of this invention to provide apparatus for handling tape in the vicinity of transducing heads with optimum damping of tape vibrations and constancy of head-tape pressure.

It is a further object of the invention to provide apparatus as above described and operable to compensate for tape dimensional changes in transports employing critically spaced transducing heads.

A device in accordance with the invention employs a capstan engaging the tape with a nearly 360-degree wrap, and a guide member for holding a portion of the tape away from the capstan to provide two unsupported tape segments of the minimum possible length, for minimum vibration. Two transducing heads engage the unsupported segments. The guide member is movable toward and away from the capstan to vary the length of tape between the heads, and particularly to compensate for dimensional changes or inaccuracies of the tape. The guide member is air-lubricated for minimum friction.

A better understanding of the invention may be had by reference to the following description, taken in conjunction with the accompanying drawings, in which.

Figures 1, 2:
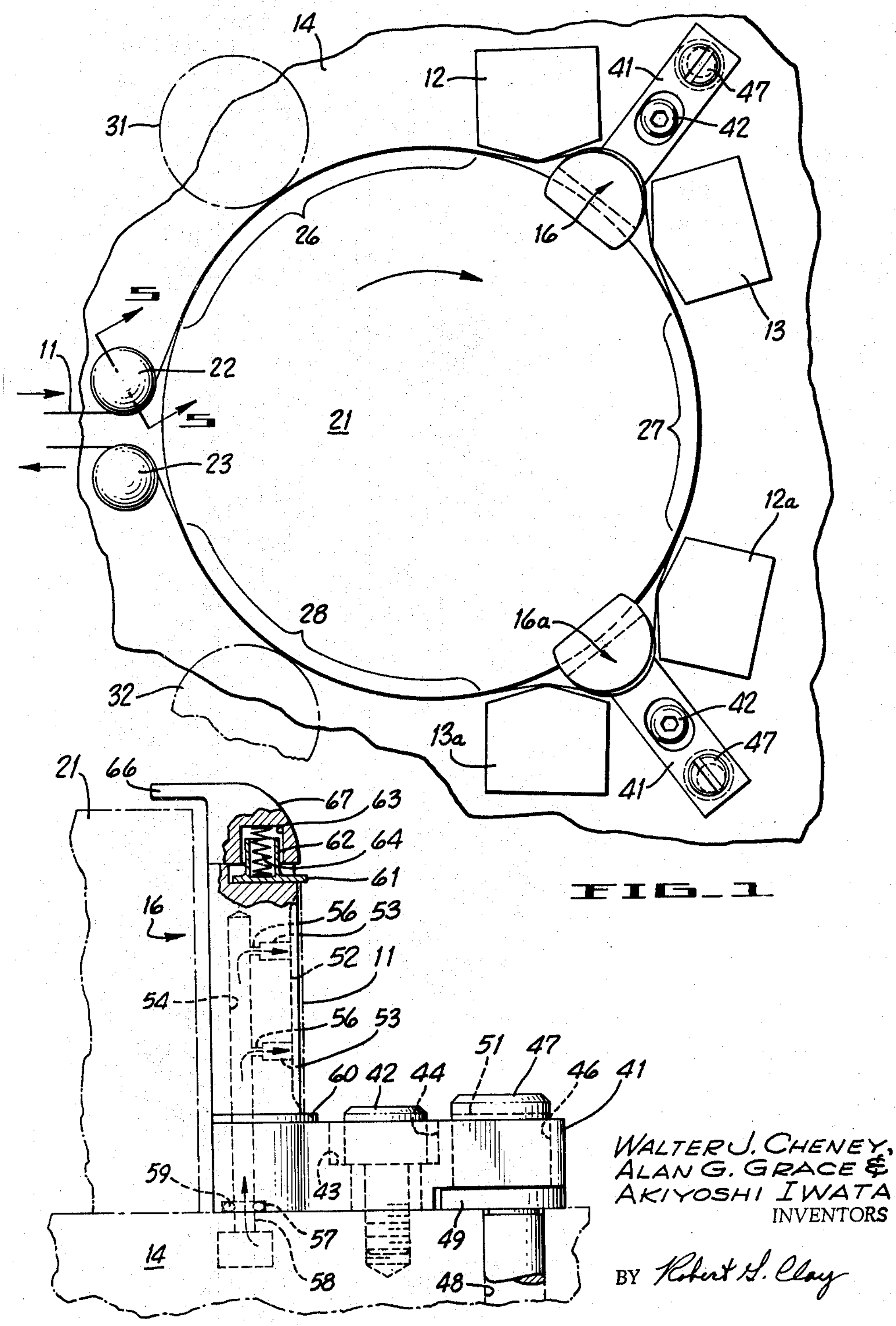
FIGURE 1 is a fragmentary plan of a device in accordance with the invention.
FIGURE 2 is an enlarged broken-away and fragmented elevation of a portion of the apparatus of FIGURE 1.

Referring now to the drawings and particularly to FIGURE 1 thereof, there is shown a tape 11 and a pair of transducing heads 12 and 13 mounted on a tape transport top plate 14 for engagement with the tape. In their simplest forms, the heads 12, 13 may be merely a pair of transducers each recording and reproducing a separate longitudinal track on the tape, the tracks being spaced laterally on the tape from one another. In the arrangement as here presented, and as generally known in the art, the heads 12, 13 are each composed of a stack of transducers spaced laterally from one another, with magnetic shielding material interpositioned between each adjacent pair of transducers. Since it is desirable to crowd as many heads as closely together as possible and since it is necessary to interposition a substantial thickness of shielding material between adjacent transducers, it follows that the most efficient arrangement is that in which the transducers of head 12 are spaced apart so as to record and reproduce alternate parallel tracks, while the transducers of the head stack 13 record and reproduce the intermediate alternate tracks. This arrangement is common in instrumentation type recorders, in which items of information are simultaneously recorded on a number of parallel tracks and are later simultaneously reproduced. The arrangement, however, leads to the difficulty that if the tape shrinks or stretches during storage after recording, and is subsequently played back even on the same machine, items of information that were simultaneously recorded by the head stacks 12 and 13 will not be reproduced simultaneously. A similar difficulty arises when a tape that has been recorded on one machine is played back on another machine of the same type, but in which the spacing of the two heads 12, 13 on the tape path is not precisely the same. Analogous to the problem of shrinking and stretching of the tape, also, is the problem of variations in the tape tension that may occur between recording and reproducing even on the same machine. If the heads 12, 13 are spaced 1.5 inches apart, and if the tape is recorded at a tension of six ounces and played back at a tension of twelve ounces, the tape will be appreciably stretched by the increase of tension to the degree that every 1.5 inch segment of tape becomes approximately 1.5014 inches long, and an intolerable error results in the timing of the reproduction of the tracks of head 12 and the tracks of head 13.

Figure 3:
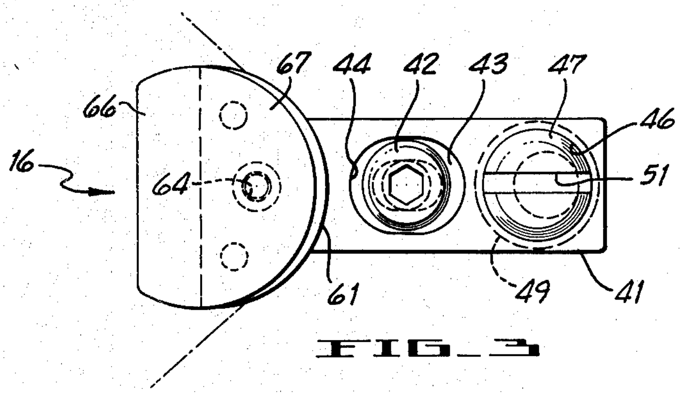
FIGURE 3 is a plan of a portion of the apparatus of FIGURE 2.

Accordingly, the present invention arranges that a guide member 16 is interpositioned between the heads 12 and 13, so that the heads and the member constitute a group of three tape engaging elements spaced along the tape path and inducing bends therein, the member 16 being the central element of the group, and the heads 12 and 13 constituting flanking elements of the group. The element 16 is sometimes loosely called a "half-moon" because the shape of half-moon is a useful cross-sectional shape for the element; but other shapes may also be useful. The element 16 is arranged to be movable in a plane transverse to the length of the tape so as to adjustably vary the actual length of the tape between the heads 12 and 13. Thus if the tape has shrunk after recording, the element 16 can be moved to the left and downward as shown in the figure so as to decrease the length of tape between the heads and ensure that items of information that were recorded simultaneously on all tracks are reproduced simultaneously. Conversely if the tape has stretched during storage, the member 16 can be moved to the right and upward as shown in the drawing to increase the length of the tape between the heads and effect a converse compensation. The structure by which these adjustments are effected will be described in connection with FIGURES 2 and 3, after a further description of the apparatus shown in FIGURE 1 as follows:

One of the problems in handling tape in the vicinity of transducing heads, as in the "closed loop" device previously mentioned, is that the head by its nature is required to be stationary and that stiction vibrations are usually induced in the tape, these vibrations being longitudinal vibrations caused by the uneven tendency of the frictional surfaces of the tape and head to slide relatively to one another and to stick to one another. Short of ideally perfect lubrication, one means of dealing with the problem is to make the unsupported length of tape in the vicinity of the head as short as possible, which arrangement has the effect of elevating the frequency of vibration to a point outside the range that causes difficulty. The typical closed loop device, however, is limited by its dimensional proportions to an unsupported tape length that is much too long. The zero-loop device of course has no unsupported tape near the heads, but this device does have the inherent disadvantage that out-of-roundness or eccentricity of the capstan causes varying head to tape pressure and consequent distortion of the signal.

The "zero-loop" device as above described has an important advantage, however, in that the capstan can be made as a massive member in the nature of a fly-wheel, engaging the tape over a large angle of wrap, and this arrangement has the effect of at least isolating the tape at the head from the effect of vibrations induced by the rotating reels and other tape engaging members outside the loop.

With the object of taking advantage as nearly as possible of the principles above noted, and recognizing furthermore that there must be some tape engaging members flanking the heads 12, 13 and bending the tape in order to induce the bends that are necessary at the heads, the present invention employs a rotating capstan 21 for driving the tape. The capstan engages the tape on both sides of the group of elements 12, 16, 13 and is spaced very closely to the elements, so as to isolate the tape at the heads from the vibrations of the tape reels, and so as to provide the shortest possible length of unsupported tape at each head.

In considering the above described arrangement, it must be recognized that there are two essential conditions for guiding the tape in a desired path: first, a means for tensioning the tape at both ends; and second, a plurality of tape engaging guide elements spaced along the tape path and inducing bends in the tape, in cooperation with the tension. If the tape is not tensioned, then there is no assurance that it will conform to the path defined by the guides. Conversely, if the guides do not induce bends in the tape, then they cannot be said to be engaging the tape in such a way as to guide it. Furthermore, in order to cause engagement of the tape at the head there must be at least two elements flanking the head on the tape path in such a way as to induce three bends, one at each of the guiding elements, and one at the head. Where two heads are used as in the present invention, there must be at least four tape bending elements including the two heads and two flanking guides; and the member 16 of the present invention constitutes a fifth element useful for varying the length of tape between the heads as above described. In the present invention, therefore, the capstan 21 constitutes a single element performing the task of the flanking guides and engaging and bending the tape on either side of the group of elements 12, 16 and 13. Thus in one structure the tape is guided to engage the heads, to be variable in length between the heads, and to be isolated from the vibrations of the tape reels.

As another feature of the invention, a pair of guide elements 22 and 23 are positioned near the capstan and spaced very closely together so as to engage and bend the tape and to induce the tape to engage the capstan with a maximum wrap as in the zones 26, 27 and 28. A second group of heads **12*a* and 13*a*, together with an intervening member 16*a* is here shown as provided between the zones 27 and 28. As many such groups of heads and intervening adjustable guides may be provided as desired. Also, one or more pinch rollers 31 and 32 may be provided to press the tape against the capstan in the zones 26, 28** as desired; or other means known in the art may be used, such as air pressure or suction capstan devices, to ensure that the tape is solidly engaged with the capstan for driving of the tape.

The invention also envisages that the capstan 21 and member 16 may be employed with but a single head such as the head 12, this combination being useful even when the member 16 is not movable, the essential requirement being that any of the unsupported lengths of tape, such as the length 36, is of a dimension substantially less than the length of tape in any of the zones 26–28. Thus it is ensured that the unsupported length of tape is as short as possible while the supported length of tape in engagement with the capstan is as long as possible for minimization of stiction vibration and for maximization of the driving, damping, and vibration isolating effects of the capstan 21 and the runout problems associated with zero-loop capstans are also avoided.

Referring now to FIGURE 2 the arrangement of the element 16 for movement laterally of the tape is illustrated. Member 16 is mounted as an extension from a slidable base member 41, which is secured to the top plate 14 as by means of a bolt 42 that may be loosened when it is desired to move the member and tightened when it is desired to clamp the member in its adjusted position. The bolt 42 engages a slot 43 in an elongated recess 44 formed in the member 41 so as to permit the sliding motion desired. To control the motion, a further opening 46 is provided into which is fitted an eccentric pin 47 that is journaled in a bore 48 formed in the top plate 14. The pin 47 has a flange 49 extending radially outwardly between the member 41 and the top plate to ensure that the pin is retained in the assembly in any position thereof. A screw driver slot 51 is provided in the pin 47 for turning the pin. The sliding pivoting motion of the member 41 that is induced by the turning of the pin 47 has no deleterious effect on the adjustment of the tape at the heads, and the main effect, that of moving the member 16 in a radial direction of the capstan and transverse to the plane of the tape, is not obscured.

Figure 4:
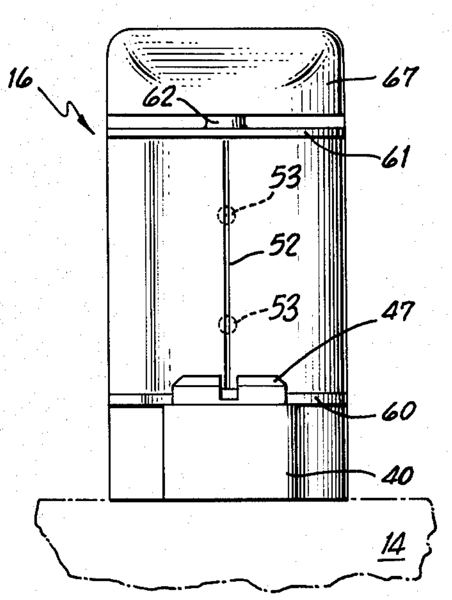
FIGURE 4 is a side elevation of a portion of the apparatus of FIGURE 2.

In order to reduce as far as possible the effect of frictional rubbing in the vicinity of the heads, the member 16 may be constructed as a roller guide, but is preferably constructed as here shown to provide air film lubrication of the tape in passage over the member. As shown in FIGURES 2 and 4, a longitudinal slot 52 is milled in the member 16 on the side remote from the capstan 21. A pair of air conducting bores 53 are formed in the member communicating with the bottom of slot 52 and extending toward the interior of the member where they are joined to a longitudinal duct 54 via restricted orifices 56 for regulating the flow of pressurized air to the tape. The duct 54 has an enlarged orifice 57 confronting the top plate 14 and communicating with the orifice of a duct 58 that in turn communicates with a source of pressurized air (not shown). The enlarged orifice 57 of the duct 54 is sufficiently large to preserve communication with the duct 58 in all positions of the member 41 that are induced by rotation of the pin 47. In addition, a resilient pressure sealing ring 59 is inserted in the orifice 57 to prevent the escape of air in passage from the duct 58 to the duct 54. Thus a film of pressurized air is caused to emerge from the slot 52 and to flow between the tape and the adjacent surface of the member 16, floating the tape substantially frictionlessly over the member.

Further features of the member 16 include a pair of tape edge guiding flanges 60 and 61. The flange 60 is fixed and is used as a reference edge guide to guide the tape by one reference edge (the lower edge in this example). The upper flange 61 is mounted for axial movement in the member 16 as by means of an extension 62 riding in a bore 63 in the member; and a spring 64 loads the flange 61 toward the tape upper edge to ensure that the tape always engages the fixed lower flange 60. Thus in this invention the tape may be accurately edge-guided and the heads may be solidly mounted so as to avoid tilting of the tracks or head laterally with respect to one another, and the time-displacement errors typical of other devices are avoided.

The member 16 also has a flange 66 extending from the extended end of the member 61 and around the peripheral portion of the capstan 21 in a radially inward direction. The flange 66 is of use in effecting correct threading of the tape, i.e., in preventing threading of the tape between the member 16 and the capstan. To further facilitate threading of the tape, the side of the member 16 remote from the capstan and adjacent the extending end of the member has a rounded portion 67.

Figure 5:
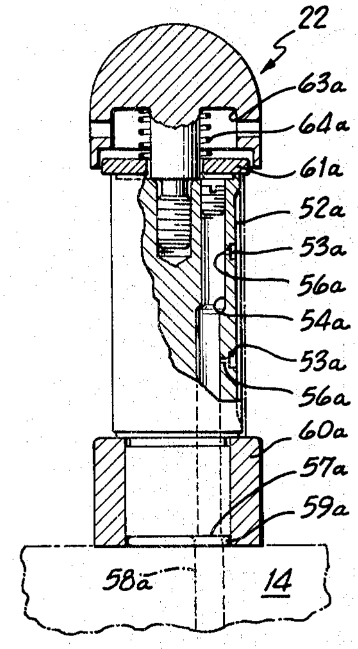
FIGURE 5 is a sectional elevation of a portion of the apparatus of FIGURE 1, taken along the plane of lines 5—5 of FIGURE 1.

To further assure correct edge guiding of the tape and a frictionless passage of the tape over the guides 22, 23, these guides are also provided with edge guiding flanges and air lubrication means 60*a*, 61*a*, 63*a*, 64*a* 52*a*, 53*a*. 54*a*, 56*a*, 57*a*, 58*a* and 59*a*, similar to the correspondingly numbered parts of the member 16. These parts are shown in FIGURE 5, it being understood that the guide 23 is constructed exactly the same as guide 22.

Thus there has been described a device in accordance with the invention employing a capstan engaging the tape with a nearly 360-degree wrap, and a guide member for holding a portion of the tape away from the capstan to provide two unsupported tape segments of the minimum possible length, for minimum vibration. Two transducing heads engage the unsupported segments. The guide member is movable toward and away from the capstan to vary the length of tape between the heads, and particularly to compensate for dimensional changes or inaccuracies of the tape. The guide member is air-lubricated for minimum friction.

What is claimed is:

1. In a tape transport including tensioning means for the ends of said tape and a plurality of tape-engaging elements spaced along the tape path and inducing bends therein, the combination comprising:
- a pair of transducing heads constituting the flanking pair of a group of three of said elements; and
- a member constituting the central element of said group, said member being movable in a transverse plane of said tape to vary the length of the tape segment lying between said transducing heads.

2. In a tape transport including tensioning means for the ends of said tape and a plurality of tape-engaging elements spaced along the tape path and inducing bends therein, the combination comprising:
- a pair of transducing heads constituting the flanking pair of a group of three of said elements;
- a member constituting the central element of said group, said member being movable in a transverse plane of said tape to vary the length of the tape segment lying between said transducing heads; and
- a capstan constituting a fourth of said elements and engaging and bending said tape in two separate zones flanking said group.

3. In a tape transport including tensioning means for the ends of said tape and a plurality of tape-engaging elements spaced along the tape path and inducing bends therein, the combination comprising:
- a pair of transducing heads constituting the flanking pair of a group of three of said elements;
- a member constituting the central element of said group, said member being movable in a transverse plane of said tape to vary the length of the tape segment lying between said transducing heads;
- a capstan constituting a fourth of said elements and engaging and bending said tape in two separate zones flanking said group; and
- a pair of guides constituting other of said elements and engaging and bending said tape in flanking relation to said group and zones.

4. In a tape transport including tensioning means for the ends of said tape and a plurality of tape-engaging elements spaced along the tape path and inducing bends therein, the combination comprising:
- two pairs of transducing heads, each pair constituting the flanking pair of a corresponding group of three of said elements;
- two members each constituting the central element of a corresponding one of said groups,
- each of said members being movable in a transverse plane of said tape to vary the length of the tape segment lying between the corresponding pair of transducing heads;
- a capstan constituting a fourth of said elements and engaging and bending said tape in three separate zones intermediate and flanking said groups; and
- a pair of guides constituting other of said elements and engaging and bending said tape in flanking relation to said groups and zones.

5. In a tape transport including tensioning means for the ends of said tape and a plurality of tape-engaging elements spaced along the tape path and inducing bends therein, the combination comprising:
- a pair of transducing heads engaging one side of said tape and constituting the flanking pair of a group of three of said elements;
- a member engaging the other side of said tape and constituting the central element of said group, said member being movable in a transverse plane of said tape to vary the length of the tape segment lying between said transducing heads;
- a capstan constituting a fourth of said elements and engaging said other side of said tape in two separate zones flanking said group; and
- a pair of guides constituting other of said elements and engaging said one side of said tape in flanking relation to said group and zones.

6. In a tape transport including tensioning means for the ends of said tape and a plurality of tape-engaging elements spaced along the tape path and inducing bends therein, the combination comprising:
- two pairs of transducing heads engaging one side of said tape and each pair constituting the flanking pair of a corresponding group of three of said elements;

two members engaging the other side of said tape and each constituting the central element of a corresponding one of said groups;

each of said members being movable in a transverse plane of said tape to vary the length of the tape segment lying between the corresponding pair of transducing heads;

a capstan constituting another of said elements and engaging said other side of said tape in three separate zones intermediate and flanking said groups; and a pair of guides constituting other of said elements and engaging said one side of said tape in flanking relation to said groups and zones.

7. In a tape transport including tensioning means for the ends of said tape and a plurality of tape-engaging elements spaced along the tape path and inducing bends therein, the combination comprising:

two pairs of transducing heads engaging one side of said tape and each pair constituting the flanking pair of a corresponding group of three of said elements;

two members engaging the other side of said tape and each constituting the central element of a corresponding one of said groups;

each of said members being movable in a transverse plane of said tape to vary the length of the tape segment lying between the corresponding pair of transducing heads;

a capstan constituting another of said elements and engaging said other side of said tape in three separate zones intermediate and flanking said groups;

a pair of guides constituting other of said elements and engaging said one side of said tape in flanking relation to said groups and zones; and means for clamping said tape in frictional driving engagement with said capstan at any of said zones.

8. In a tape transport including tensioning means for the ends of said tape and a plurality of tape-engaging elements spaced along the tape path and inducing bends therein, the combination comprising:

two pairs of transducing heads engaging one side of said tape and each pair constituting the flanking pair of a corresponding group of three of said elements;

two members engaging the other side of said tape and each constituting the central element of a corresponding one of said groups;

each of said members being movable in a transverse plane of said tape to vary the length of the tape segment lying between the corresponding pair of transducing heads;

a capstan constituting another of said elements and engaging said other side of said tape in three separate zones intermediate and flanking said groups;

a pair of guides constituting other of said elements and engaging said one side of said tape in flanking relation to said groups and zones; and a pinch roller for clamping said tape in frictional driving engagement with said capstan at any of said zones.

9. In a tape transport including tensioning means for the ends of said tape and a plurality of tape-engaging elements spaced along the tape path and inducing bends therein, the combination comprising:

a drum constituting one of said elements engaging said tape in two separate zones and rotating with said tape; and means constituting another of said elements for holding said tape barely away from said drum intermediate said zones.

10. In a tape transport including tensioning means for the ends of said tape and a plurality of tape-engaging elements spaced along the tape path and inducing bends therein, the combination comprising:

a drum constituting one of said elements engaging said tape in two separate zones and rotating with said tape;

means constituting another of said elements for holding said tape barely away from said drum intermediate said zones; and a transducing head constituting another of said elements and mounted to engage said tape between said zones.

11. In a tape transport including tensioning means for the ends of said tape and a plurality of tape-engaging elements spaced along the tape path and inducing bends therein, the combination comprising:

a drum constituting one of said elements engaging said tape in two separate zones and rotating with said tape;

means constituting another of said elements for holding said tape barely away from said drum intermediate said zones; and a pair of transducing heads constituting other of said elements and mounted to engage said tape between said zones and on either side of said means.

12. In a tape transport including tensioning means for the ends of said tape and a plurality of tape-engaging elements spaced along the tape path and inducing bends therein, the combination comprising:

a capstan constituting one of said elements engaging said tape in two separate zones and rotating with said tape;

a member constituting another of said elements for holding said tape away from said drum intermediate said zones at a maximum spacing substantially less than the radius of said drum; and a pair of transducing heads constituting other of said elements and mounted to engage said tape between said zones and on either side of said member, said member being movable in a transverse plane of said tape to vary the length of said tape between said heads.

13. In a tape transport including tensioning means for the ends of said tape and a plurality of tape-engaging elements spaced along the tape path and inducing bends therein, the combination comprising:

a drum constituting one of said elements engaging said tape in two separate zones and rotating with said tape; and means constituting another of said elements for holding said tape barely away from said drum intermediate said zones;

said means including means for edge-guiding said tape by one reference edge thereof.

14. In a tape transport including tensioning means for the ends of said tape and a plurality of tape-engaging elements spaced along the tape path and inducing bends therein, the combination comprising:

a capstan constituting one of said elements engaging said tape in two separate zones and rotating with said tape;

a member constituting another of said elements for holding said tape away from said drum intermediate said zones at a maximum spacing substantially less than the radius of said drum;

means mounted on said member for edge guiding said tape by one reference edge thereof; and a pair of transducing heads constituting other of said elements and mounted to engage said tape between said zones and on either side of said member;

said member being movable in a transverse plane of said tape to vary the length of said tape between said heads.

15. In a tape transport including tensioning means for the ends of said tape and a plurality of tape-engaging elements spaced along the tape path and inducing bends therein, the combination comprising:

a capstan constituting one of said elements engaging said tape in two separate zones and rotating with said tape;

a member constituting another of said elements for holding said tape away from said drum intermediate said zones at a maximum spacing substantially less than the radius of said drum;

means mounted on said member and at points flanking said capstan on the path of said tape for edge guiding said tape by one reference edge thereof; and a pair of transducing heads constituting another of said elements and mounted to engage said tape between said zones and on either side of said member;

said member being movable in a transverse plane of said tape to vary the length of said tape between said heads.

16. In a tape transport including tensioning means for the ends of said tape and a plurality of tape-engaging elements spaced along the tape path and inducing bends therein, the combination comprising:

a top plate for said transport;

a pair of transducing heads mounted on said top plate and engaging one side of said tape and constituting the flanking pair of a group of three of said elements;

a member engaging the other side of said tape and constituting the central element of said group, said member being mounted on a bracket extending in a transverse plane of said tape and slidably engaging said top plate, said bracket having a longitudinal slot formed therein, said slot being engaged by a clamping bolt passing therethrough and threaded into said top plate, and the extending end of said bracket being engaged by an eccentric pin mounted for rotation in said top plate and operable to move said bracket and member in said transverse plane of said tape and thus to vary the length of tape lying between said transducing heads;

a capstan constituting a fourth of said elements and engaging said other side of said tape in two separate zones flanking said group; and a pair of guides constituting other of said elements and engaging said one side of said tape in flanking relation to said group and zones.

17. In a tape transport including tensioning means for the ends of said tape and a plurality of tape-engaging elements spaced along the tape path and inducing bends therein, the combination comprising:

a top plate for said transport;

a pair of transducing heads mounted on said top plate and engaging one side of said tape and constituting the flanking pair of a group of three of said elements;

a member confronting the other side of said tape and constituting the central element of said group, said member being mounted on a bracket extending in a transverse plane of said tape and slidably engaging said top plate, said bracket having a longitudinal slot formed therein, said slot being engaged by a clamping bolt passing therethrough and threaded into said top plate, and the extending end of said bracket being engaged by an eccentric pin mounted for rotation in said top plate and operable to move said bracket and member in said transverse plane of said tape and thus to vary the length of tape lying between said transducing heads;

said member being in the shape of a semi-cylinder presenting a curved face for guiding said tape and having a pair of tape edge guiding flanges extending from said face, one of said flanges being mounted for engaging a first edge of said tape and for axial movement toward and away from the other of said flanges and being spring-loaded toward said other flange;

a capstan constituting a fourth of said elements and engaging said other side of said tape in two separate zones flanking said group; and a pair of guides constituting other of said elements and engaging said one side of said tape in flanking relation to said group and zones, each of said guides having a pair of tape edge guiding flanges extending radially therefrom, one flange of said last-named pair on each guide being mounted for engaging said one edge of said tape and for axial movement toward and away from the corresponding flange of the pair and being spring-loaded toward said corresponding flange.

18. In a tape transport including tensioning means for the ends of said tape and a plurality of tape-engaging elements spaced along the tape path and inducing bends therein, the combination comprising:

a top plate for said transport;

a pair of transducing heads mounted on said top plate and engaging one side of said tape and constituting the flanking pair of a group of three of said elements;

a member confronting the other side of said tape and constituting the central element of said group, said member being mounted on a bracket extending in a transverse plane of said tape and slidably engaging said top plate, said bracket having a longitudinal slot formed therein, said slot being engaged by a clamping bolt passing therethrough and threaded into said top plate, and the extending end of said bracket being engaged by an eccentric pin mounted for rotation in said top plate and operable to move said bracket and member in said transverse plane of said tape and thus to vary the length of tape lying between said transducing heads;

said member being in the shape of a semi-cylinder presenting a curved face for guiding said tape and having a pair of tape edge guiding flanges extending from said face, one of said flanges being mounted for engaging a first edge of said tape and for axial movement toward and away from the other of said flanges and being spring-loaded toward said other flange;

means for providing a film of lubricaitng air between said tape and said curved face of said member;

a capstan constituting a fourth of said elements and engaging said other side of said tape in two separate zones flanking said group; and a pair of guides constituting other of said elements and engaging said one side of said tape in flanking relation to said group and zones, each of said guides having a pair of tape edge guiding flanges extending radially therefrom, one flange of said last-named pair on each guide being mounted for engaging said one edge of said tape and for axial movement toward and away from the corresponding flange of the pair and being spring-loaded toward said corresponding flange.

19. In a tape transport including tensioning means for the ends of said tape and a plurality of tape-engaging elements spaced along the tape path and inducing bends therein, the combination comprising:

a top plate for said transport;

a pair of transducing heads mounted on said top plate and engaging one side of said tape and constituting the flanking pair of a group of three of said elements;

a member confronting the other side of said tape and constituting the central element of said group, said member being mounted on a bracket extending in a transverse plane of said tape and slidably engaging said top plate, said bracket having a longitudinal slot formed therein, said slot being engaged by a clamping bolt passing therethrough and threaded into said top plate, and the extending end of said bracket being engaged by an eccentric pin mounted for rotation in said top plate and operable to move said bracket and member in said transverse plane of said tape and thus to vary the length of tape lying between said transducing heads;

said member being in the shape of a semi-cylinder presenting a curved face for guiding said tape and having a pair of tape edge guiding flanges extending from said face, one of said flanges being mounted for engaging a first edge of said tape and for axial movement toward and away from the other of said flanges and being spring-loaded toward said other flange;

a capstan constituting a fourth of said elements and engaging said other side of said tape in two separate zones flanking said group;

a pair of guides constituting other of said elements and engaging said one side of said tape in flanking relation to said group and zones, each of said guides having a pair of tape edge guiding flanges extending radially therefrom, one flange of said last-named pair on each guide being mounted for engaging said one edge of said tape and for axial movement toward and away from the corresponding flange of the pair and being spring-loaded toward said corresponding flange; and means for providing a film of lubricating air between said tape and said curved face of said member, and between said tape and each of said guides.

20. In a tape transport including tensioning means for the ends of said tape and a plurality of tape-engaging elements spaced along the tape path and inducing bends therein, the combination comprising:

a top plate for said transport;

a pair of transducing heads mounted on said top plate and engaging one side of said tape and constituting the flanking pair of a group of three of said elements;

a member engaging the other side of said tape and constituting the central element of said group, said member being mounted on a bracket extending in a transverse plane of said tape and slidably engaging said top plate, said bracket having a longitudinal slot formed therein, said slot being engaged by a clamping bolt passing therethrough and threaded into said top plate, and the extending end of said bracket being engaged by an eccentric pin mounted for rotation in said top plate and operable to move said bracket and member in said transverse plane of said tape and thus to vary the length of tape lying between said transducing heads;

said member being in the shape of a semi-cylinder presenting a curved face for guiding said tape and having a pair of tape edge guiding flanges extending from said face, at least one of said flanges being mounted for axial movement toward and away from the other of said flanges and being spring-loaded toward said other flange;

a capstan constituting a fourth of said elements and engaging said other side of said tape in two separate zones flanking said group; and said member having a guard flange formed at the extending end of said semi-cylinder and extending radially beyond the periphery of said capstan to influence correct threading of said tape;

a pair of guides constituting other of said elements and engaging said one side of said tape in flanking relation to said group and zones.

References Cited by the Examiner

UNITED STATES PATENTS

| | | | |
|---|---|---|---|
| 2,373,107 | 4/1945 | Duffy | 226—187 |
| 2,908,495 | 10/1959 | Andrews et al. | 226—95 |
| 2,913,192 | 11/1959 | Mullin | 226—186 X |
| 2,988,294 | 6/1961 | Neff | 226—50 X |
| 3,001,733 | 9/1961 | Axon et al. | 226—50 X |
| 3,091,794 | 6/1963 | Pillsbury | 226—97 X |
| 3,104,149 | 9/1963 | Streu | 226—199 X |

M. HENSON WOOD, Jr., *Primary Examiner.*

RAPHAEL M. LUPO, *Examiner.*